June 19, 1934.  L. A. DOUGHTY  1,963,736

BATTERY PLATE

Filed Oct. 21, 1931

INVENTOR.
Leon A. Doughty,
BY Robert M. Barr
ATTORNEY.

UNITED STATES PATENT OFFICE 1,963,736

BATTERY PLATE

Leon A. Doughty, Glenside, Pa.

Application October 21, 1931, Serial No. 570,089

4 Claims. (Cl. 136—16)

The present invention relates to storage batteries and more particularly to the construction of a plate or plates for the same.

Storage battery plates as heretofore constructed of a single piece of metal in the form of a net-work framed by a rim of relatively large cross-section have some quite material disadvantages chief of which is the tendency to buckle. When a plate buckles it creates objectionable strains within the battery whch often causes ruptures of the plates, or of the separators or even fractures in the battery jars. It has been established that this buckling is caused by the growing or expanding of the active material enmeshed in the net-work and resisted by the strength of the rim.

Some of the objects of the present invention are to provide an improved battery grid or plate; to provide a one-piece battery plate that will not buckle; to provide a non-buckling battery plate which can be easily cast; to provide a battery plate having a rim frame so arranged and constructed as to give a flexing action under internal pressure whereby such pressure is distributed and dissipated so that buckling is prevented; to provide a battery plate frame or rim divided into sections and so interconnected as to permit relative independent movement of the sections; and to provide other improvements as will hereinafter appear.

Figure 1:
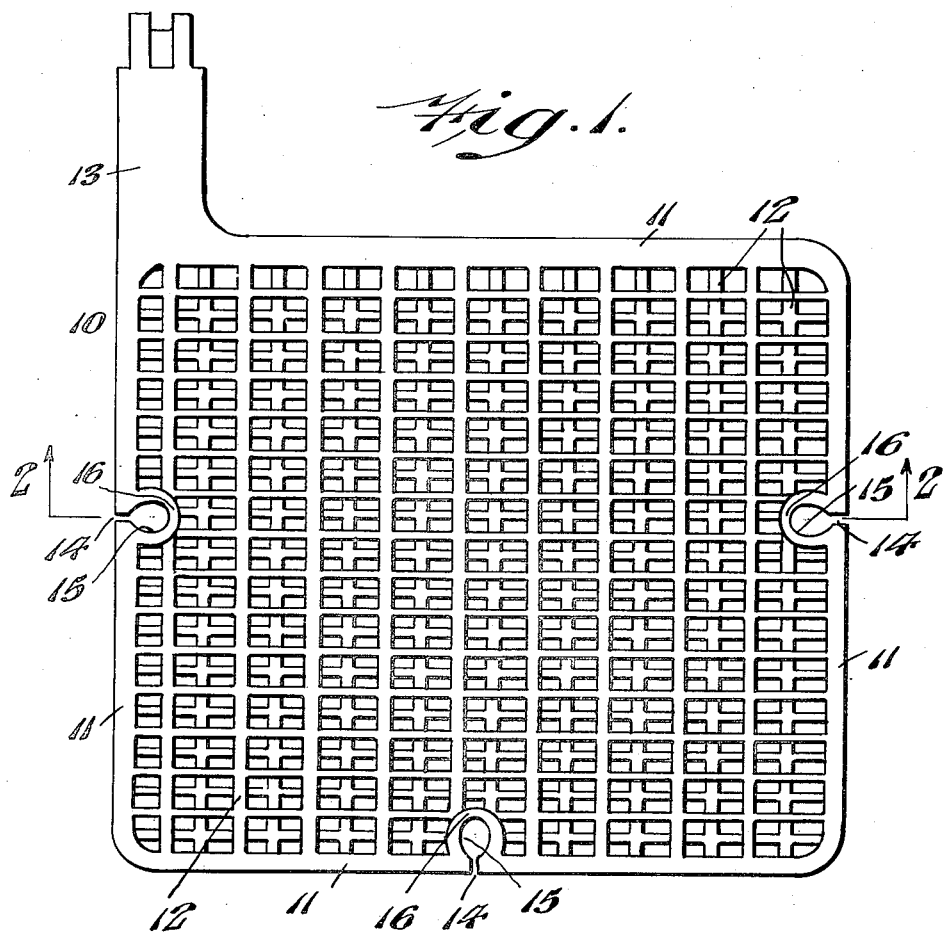
Figure 2:

In the accompanying drawing Fig. 1 represents a side elevation of a battery plate embodying one form of the present invention; and Fig. 2 represents a section on line 2—2 of Fig. 1.

Referring to the drawing one form of the present invention is shown in the plate 10 which is cast in one piece having a rim frame 11 bounding a net-work 12 of latticed relatively fine strands of metal. The top length of the frame 11 is preferably of larger cross-section than the remaining lengths of the frame 11 and the plate lug 13 projects upwardly therefrom. The network 12 is so arranged as to provide a plurality of pockets at opposite sides of the plate for the reception and retention of the active material.

In order to prevent the plate 10 from bending or buckling out of its natural plane the two side and bottom lengths of the frame 11 are split, as shown at 14, by the formation of inwardly disposed loops 15, the sides of which taper from the respective junction points with the frame 11 to substantially the middle point 16 of each of the loops 15. Expressed otherwise each loop 15 has a minimum cross-sectional area diametrically opposite to the split 14, and this area gradually increases therefrom along both legs of the loop until it merges into the area of the rim or frame 11. In this way three lengths of the frame 11 are each subdivided into two sections which are interconnected by a reduced area lying well within the confines of the frame 11 and therefore allowing two adjacent sections to expand outwardly in the plane of the plate without either the usual buckling of the plate or the application of a shearing strain to sever the bounding flange of the plate. In effect the action of each of the tapered loops 15 is that of a hinge and the resulting structure is one having great flexibility and thrust relieving properties. Furthermore the offsetting of the loops 15 inwardly of the rim 11 increases the moment of flexibility in the loop over that of the rim and added to this is the flexibility gained by the tapering and thinning of the innermost edge or bridge of the loop. It should also be noted that the top length of the plate which is integral with the current delivery lug 13 is preferably not provided with one of the loops or hinges of the present invention, because it has been found that in some instances the internal strain due to expansion causes a rim side to break at the loop portion and if this occurred in the aforesaid top length it would mean the current delivery would be materially affected. Particular attention is directed to the inward tapering of the loops since this leads to a point of weakness which yields readily under the internal pressure to give the desired outward movement of the frame which thus avoids buckling out of the plane of the plate. Where loop devices and slots have been tried before in portions of the plate rim there has been no variation in the cross-section of the rim at these supposedly weak points and as a result the expansion of the active material is ineffective to bend the full section and consequently buckling which was sought to be avoided takes place just the same as though the rim were not interrupted by improper and improperly designed expansion compensators.

While only a single form is shown in which this invention may be embodied, it is to be understood that the invention is not limited to any specific construction, but might be applied to various forms without departing from the spirit of the invention or the scope of the appended claims.

Having thus described my invention, I claim:

1. A storage battery plate comprising a single piece of metal of rectangular shape including a network bounded by a rim of relatively large cross section, a plurality of the sides of said rim being split transversely and the opposed ends thereof being interconnected respectively by inwardly disposed loops, each loop having connection through said network with the opposite side of said rim and one cross-sectional area of each loop being less than any other cross-sectional area of that loop whereby expansion of said network causes said loop to open and prevent buckling of said plate.

2. A storage battery plate comprising a single piece of metal of rectangular shape having a rim of relatively large cross-section, a set of relatively thin parallel rods interconnecting two opposite sides of said rim, a second set of parallel rods interconnecting the other two opposite sides of the rim and joined to said first set to form a lattice bounded by said rim, two opposite sides of said rim being cut through at substantially the median line of the lattice and one of the other sides of said rim being cut through at the other median line of said lattice, and loops respectively projecting inwardly from said rim and interconnecting the spaced ends of each of the cut portions of said rim, each of said loops diminishing in width from the rim to the bridge of the loop but of undiminished thickness whereby each adjacent pair of loops is spaced by an area subjected to expansion and thereby permits each rim section to swing outwardly about each loop as a hinge.

3. A storage battery plate comprising a single piece of metal of rectangular shape having a rim of relatively large cross-section including an extended lug, a set of relatively thin parallel rods interconnecting two opposite sides of said rim, a second set of parallel rods interconnecting the other two opposite sides of the rim and joined to said first set to form a lattice bounded by said rim, two or more sides of said rim being cut through remote from any corner of said plate, and loops projecting inwardly from said rim and respectively interconnecting the spaced ends of each of the cut portions of said rim, each of said loops diminishing in width from the rim to the bridge of the loop whereby each adjacent pair of loops is spaced by an area subjected to expansion to permit each rim section to swing outwardly about each loop as a hinge.

4. A storage battery plate comprising a single piece of metal of rectangular shape having a rim of relatively large cross-section including an extended lug, a set of relatively thin parallel rods interconnecting two opposite sides of said rim, a second set of parallel rods interconnecting the other two opposite sides of the rim and joined to said first set to form a lattice bounded by said rim, two or more sides of said rim being cut through remote from any corner of the plate, and loops projecting inwardly from said rim for only a relatively short distance into the lattice and respectively interconnecting the spaced ends of each of the cut portions of said rim, each of said loops having at least one cross-sectional area less than any cross-sectional area of said rim, whereby each adjacent pair of loops is spaced by an area subjected to expansion to permit each rim section to swing outwardly about each loop as a hinge.

L. A. DOUGHTY.